United States Patent [19]
Kern

[11] Patent Number: 5,493,290
[45] Date of Patent: Feb. 20, 1996

[54] SIGNAL PROCESSING SYSTEM FOR ABSOLUTE-VALUE SENSORS HAVING PERIODIC STRUCTURES, PARTICULARLY FOR POSITION AND ANGLE SENSORS

[75] Inventor: Wolfram Kern, Magdeburg, Germany

[73] Assignee: VDO Adolf Schindling AG, Frankfurt am Main, Germany

[21] Appl. No.: 182,754

[22] Filed: Jan. 14, 1994

[30] Foreign Application Priority Data

Mar. 17, 1993 [DE] Germany ............................ 43 08 462.1

[51] Int. Cl.$^6$ .................................................. G08C 19/16
[52] U.S. Cl. ................................ 340/870.37; 340/870.31; 340/870.38; 324/662
[58] Field of Search ........................... 340/870.30, 870.37, 340/870.31, 870.32, 870.38; 324/661, 662, 670, 688, 690, 686

[56] References Cited

U.S. PATENT DOCUMENTS

| | | | |
|---|---|---|---|
| 4,058,765 | 11/1977 | Richardson et al. | 324/690 |
| 4,504,832 | 3/1985 | Conte | 340/870.37 |
| 4,543,526 | 9/1985 | Burckhardt et al. | 324/660 |
| 4,733,235 | 3/1988 | Baer et al. | 340/870.37 |
| 4,743,902 | 5/1988 | Andermo | 340/870.37 |
| 4,878,013 | 10/1989 | Andermo | 340/870.37 |
| 4,959,615 | 9/1990 | Andermo | 340/870.37 |
| 5,053,715 | 10/1991 | Andermo | 340/870.37 |

FOREIGN PATENT DOCUMENTS

| | | |
|---|---|---|
| 2853142 | 6/1979 | Germany . |
| 3436681 | 5/1985 | Germany . |

*Primary Examiner*—John K. Peng
*Assistant Examiner*—Daniel J. Wu
*Attorney, Agent, or Firm*—Martin A. Farber

[57] ABSTRACT

A signal processing arrangement for absolute-value sensors in which, within the periodic structure (3) a measurement surface which is divided into a plurality of measurement sections lies opposite at least one probe, each measurement section representing a position marking. Inputs ($E_n$) of the periodic sensor structure (3) are cyclically connected to a signal source (1) via a switch input group (2), and outputs ($O_n$) of the periodic structure (3) are connected to an evaluation circuit. In order to convert the geometrical value into an absolute electrical image signal, at least one probe in combination with, in each case, one measurement section forms at least one switch unit for each measurement position ($X_i$). Between the outputs ($O_n$) of the periodic structure (3) and the evaluation circuit (5), a cyclically switching output switch group (4) is arranged, and the switch units ($X_1$) of the periodic sensor structure (3) which represent the same position are connected to each other on the input and/or output side.

8 Claims, 5 Drawing Sheets

Fig. 4a
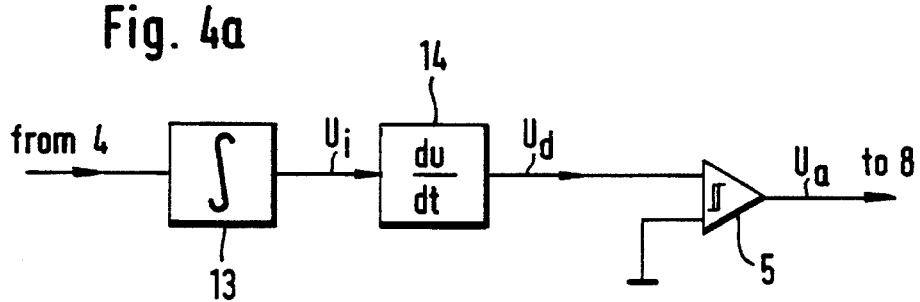
Fig. 4b
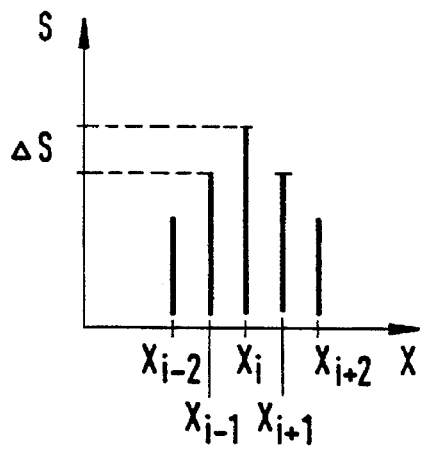
Fig. 4c
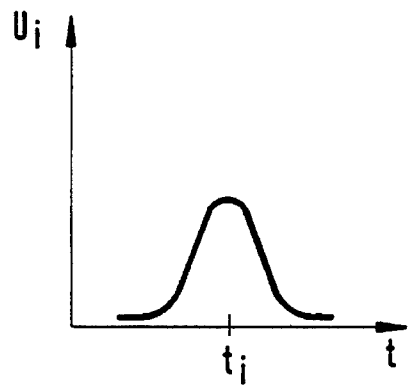
Fig. 4d
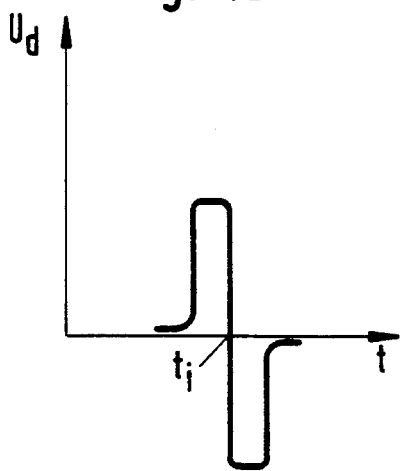
Fig. 4e
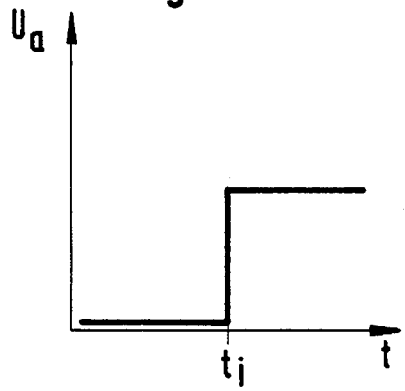
Fig. 4

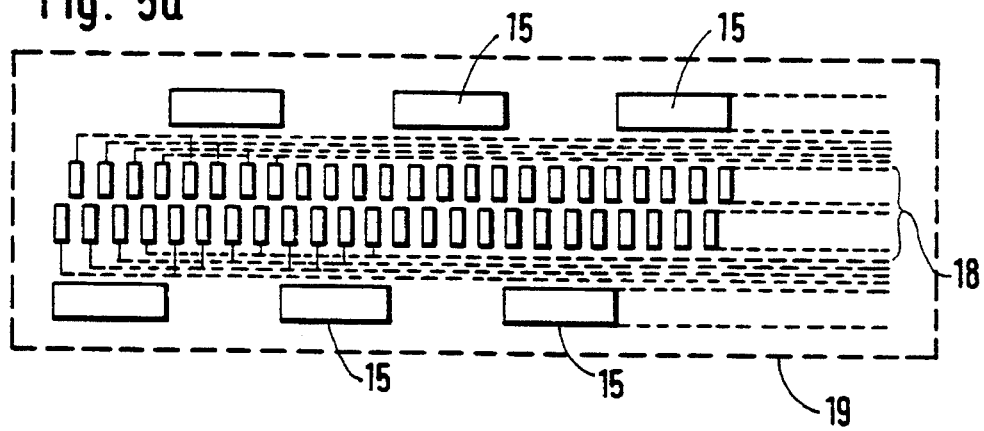
Fig. 5a
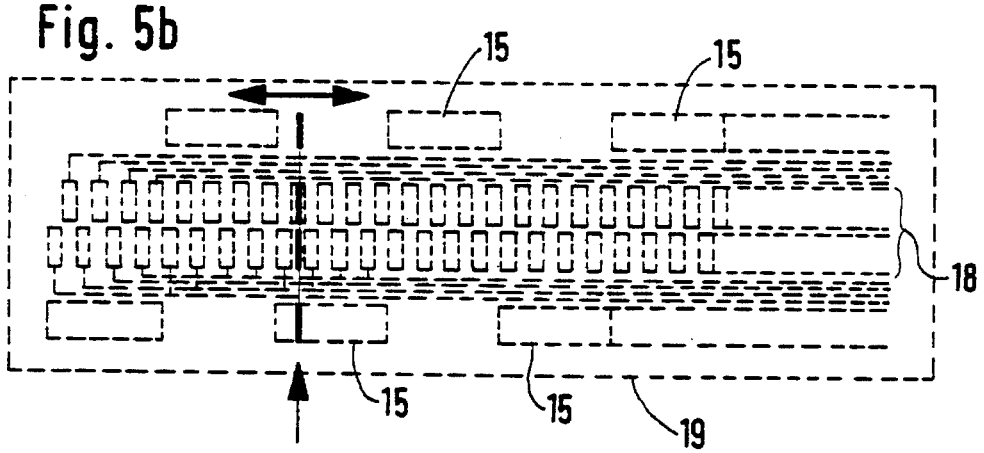
Fig. 5b
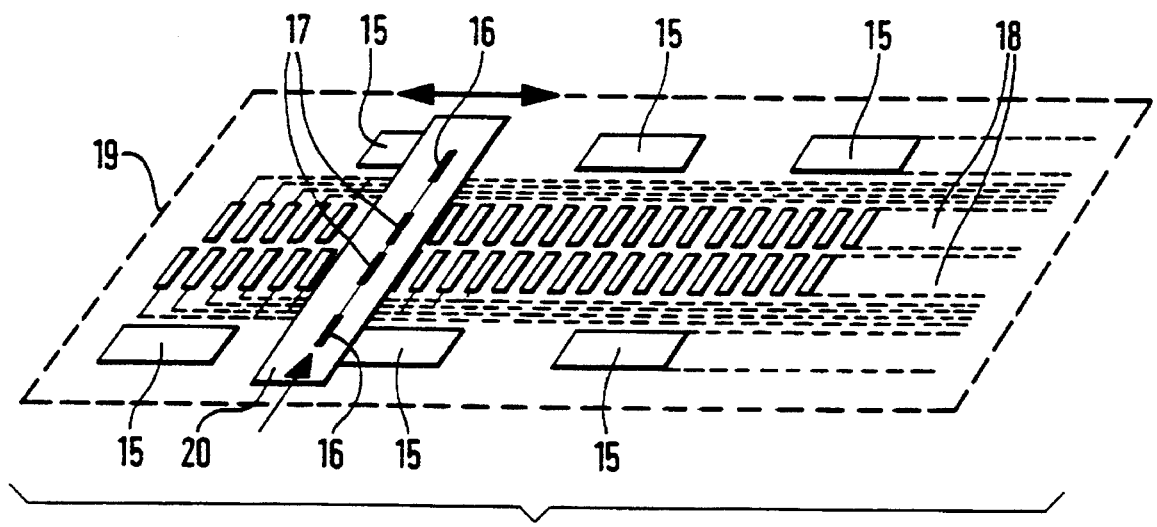
Fig. 5c
Fig. 5

5,493,290

SIGNAL PROCESSING SYSTEM FOR ABSOLUTE-VALUE SENSORS HAVING PERIODIC STRUCTURES, PARTICULARLY FOR POSITION AND ANGLE SENSORS

FIELD AND BACKGROUND OF THE INVENTION

The present invention relates to a signal processing system for absolute-value sensors with periodic structures, particularly for position and angle sensors, in which, within a periodic structure, there is a measurement surface which is divided into several measurement sections and lies opposite at least one probe. Each measurement section represents a position marking, inputs to the periodic sensor structure are cyclically connected via a switch input group to a signal source, and outputs of the periodic sensor structure are connected to an evaluation circuit.

Highly accurate sensors for the precise determination of geometrical values, and which are stable for a long time are based on the principle of scanning periodic structures, which can be designed as a very stable reference scale. This principle is employed in incremental or coordinated path, position or angle-of-rotation sensors.

Systems which operate in accordance with the foregoing electronic inquiry principles are known. An example of such a sensor is described in U.S. Pat. No. 4,733,235 of J. A. Baer, et al wherein AC signals are applied successively to electrodes of a bank of electrodes capacitively coupled to electrodes of a second bank positioned at a different pitch to provide a vernier displacement measurement system.

The periodic sensor, under consideration in the case of the present invention, is cyclically controlled via a multiplexer which, in its turn, is excited by an oscillator of predetermined amplitude. Scanning control signals cause the multiplexer to switch the oscillator signal in succession solely to, in each case, one measurement surface.

The information-bearing parameters are, in this connection, coded in the signal amplitude, which is susceptible, however, to the influence of external noise signals. Thus, additional measures are necessary in order to suppress the noise signal.

For the detection of n positions, an equal number of switches and at least n electric connections on the sensor element are necessary. The measurement surface itself is divided into several measurement sections.

The disadvantage is that, after every intended or unintended interruption of the supply voltage, a zero position must first of all be employed in order to detect the instantaneous absolute position of the object being measured at the time of connection. Only then can each further change in position be detected by counting the periodic markings of the sensor element which are passed over by the probe in the sensor.

SUMMARY OF THE INVENTION

It is an object of the invention to provide a signal processing system for absolute-value sensors with periodic structures which convert geometrical values into an absolute electrical image signal, and also satisfies stringent requirements as to noise signal.

According to the invention, at least one probe, in combination with, in each case, one measurement section, forms at least one switch unit for each measurement position ($X_i$), and a cyclically switching output switch group (4) is arranged between outputs ($O_n$) of the periodic structure (3) and the evaluation circuit (5). Switch units ($X_i$) of the periodic sensor structure (3) which represent the same position are connected to each other on the input and/or output side.

The advantage of the invention resides in the fact that the information with regard to the absolute value of the sensor parameter is anchored in the sensor structure itself. As a result, in the case of $2^n$ positions to be covered, the signal processing is reduced to $2^{n/2}$ channels.

In this connection, outputs of the periodic sensor structure which mark the same position are connected concurrently to a comparator. From an image signal there can be derived an analog voltage or an analog current, which can possibly be transmitted over a two-wire line.

The derivation of a binary signal is also readily possible in the manner that the output of the comparator (5) is connected to the first input of a trigger circuit (flip flop 8), and the second input of the trigger circuit connects to the output switch group (4). The output of the trigger circuit (8) is connected to a shift register (9), the input of the shift register 9 connecting to a clock generator 12.

In one embodiment, the clock generator (12) is connected to a first ring counter (6) which, in its turn, leads to a second ring counter (7) which switches the output switch group (4), this ring counter (7) being present on the reset input of a flip-flop (8) the set input of which is connected to the output of the comparator (5), the shift register (9) being also clocked by the clock generator (12).

In order to assure well-defined conditions after application of the operating voltage, a reset circuit (11) is connected between the clock generator (12) and the second ring counter which controls the output switch group.

In order to prevent crosstalk effects of the sensor switches, a band filter (13, 14) is connected between the output switch group (4) and the comparator (5) in a further embodiment.

The band filter preferably comprises a series connection of an integrator and a differentiator.

According to a feature of the invention, the output switch group (4) is connected via an integrator (13) and a following differentiator (14) to the comparator (5).

BRIEF DESCRIPTION OF THE DRAWINGS

With the above and other objects and advantages in view, the present invention will become more clearly understood in connection with the detailed description of preferred embodiments, when considered with the accompanying drawings, of which:

FIG. 4 comprises FIGS. 4a–4e wherein

FIG. 4a is a circuit and course of signal for the avoidance of crosstalk effects;

FIGS. 4b–4e are graphs of signals for explaining operation of the invention; and FIG. 5 comprises FIGS. 5a–5c which show a capacitive sensor structure.

DETAILED DESCRIPTION OF THE PREFERRED EMBODIMENTS

Figure 1:
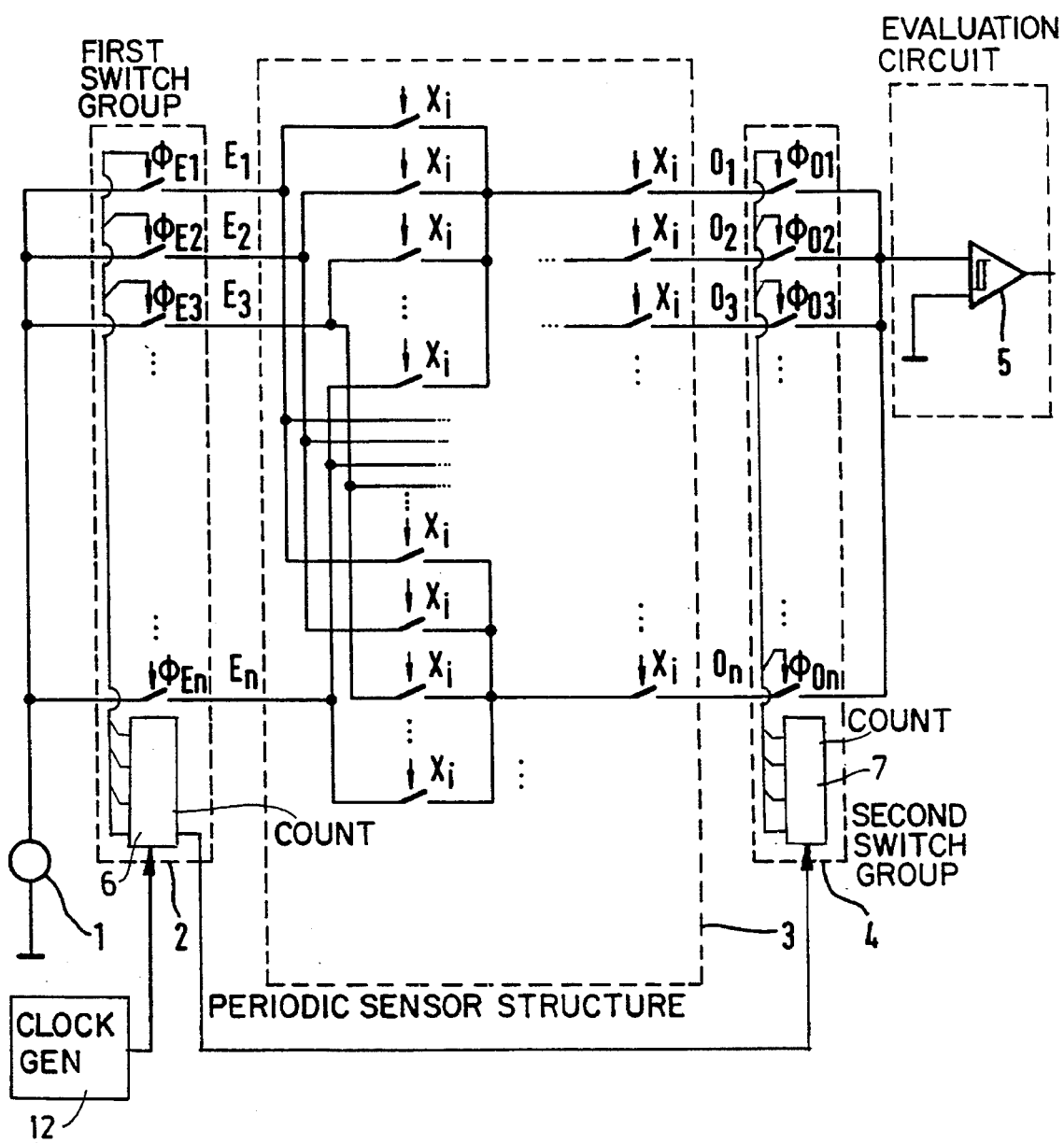
FIG. 1 is a first sensor switch arrangement.
Figure 2:
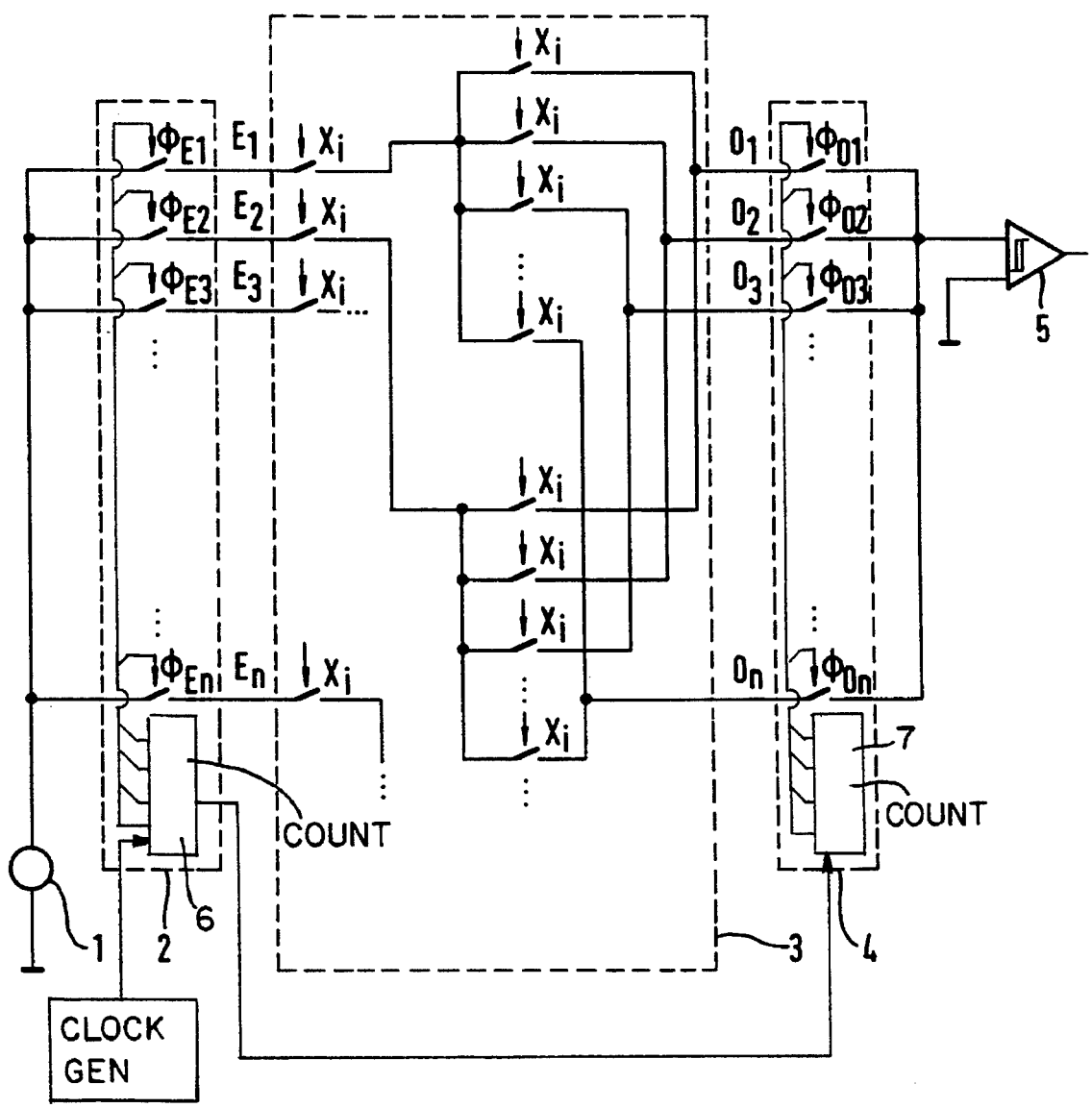
FIG. 2 is a second sensor switch arrangement.

FIGS. 1 and 2 show two possible embodiments of the periodic sensor structure 3. The sensor structure 3 consists of one or more probes, wherein the relative position of a probe with regard to a measurement surface having position markings is changed by the measurement object the position of which is to be covered.

Probe and position markings of the sensor together form a combination of switches $X_i$.

These switches $X_i$ are influenced by the geometrical value to be detected (distance, spacing, angle, etc.) and switch a signal from a given input $E_n$ to a given output $O_n$.

There are precisely n switch combinations, so that the geometrical value to be determined can be determined in precisely n steps, in the manner that a signal is applied cyclically to each input of the sensor structure and at the same time the reaction of the outputs is observed by cyclic scanning.

In accordance with FIG. 1, the signal from the signal source 1 is applied cyclically to the inputs $E_n$ of the sensor structure 3 by an electronic input switch group 2, preferably CMOS switches. Switch driving circuitry including counters driven by a clock generator, as will be described herein, provides for cyclical operation of a set of switches in each of the input switch group 2 and an output switch group 4.

The outputs $O_n$ are also scanned cyclically via an output switch group 4. A switch $X_1$ of the sensor structure 3 is closed when the probe is opposite a position marking of the sensor; otherwise it is open.

If, upon the scanning, a switch combination with which all switches $X_i$ are closed is found by the input and output switch groups 2 and 4 of the periodic sensor structure 3, then a comparator 5 detects the signal of the signal source 1 resulting in a change of state of the comparator output.

There is an unequivocal, absolute association between the switch positions of the electronic switch groups 2 and 4, the instantaneous probe position marking pair $X_i$, and the control word, consisting of the signal quantity $$\{\phi_{E1} \ldots \phi_{E2}{}^{n/2}; \phi_{O1} \ldots \phi_{O2}{}^{n/2}\}$$

wherein $\phi_{En}$ and $\phi_{On}$ are, respectively an input signal of switch group 2 and an output signal of switch group 4. It is thus possible to form the absolute image signal of the physical value from the control word of the electronic control group 2 and 4 and the output signal of the comparator 5.

Figure 3:
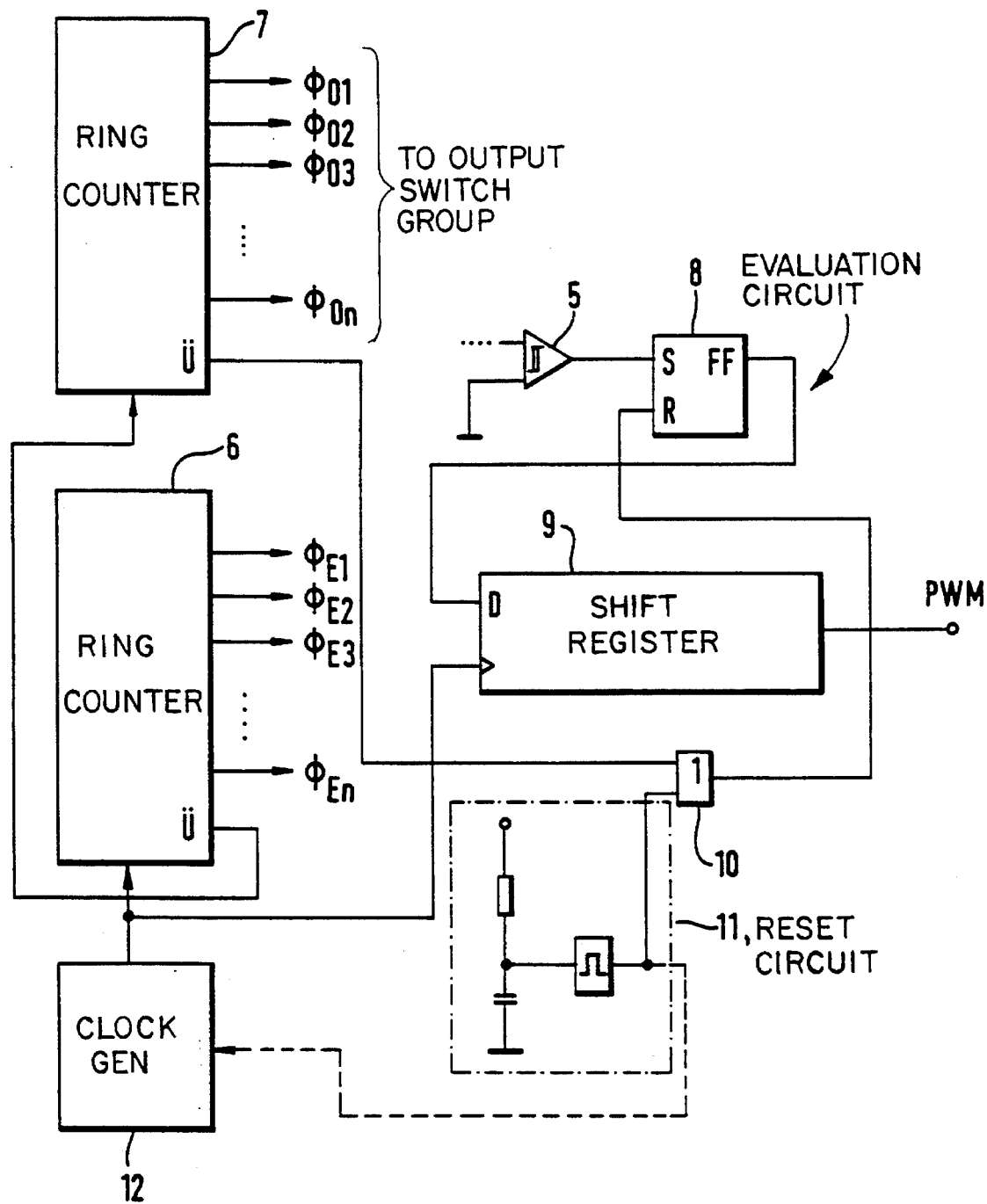
FIG. 3 is a circuit for digital signal processing.

In the operation of the switch driving circuitry, a control word for the electronic switch groups 2 and 4 is formed, in accordance with FIG. 3, in the manner that a ring counter 6 receives pulses from a clock generator 12. The output terminals of a ring counter 6 connect with control terminals of respective ones of the switches of the input switch group 2, as shown in FIGS. 1 and 2, to provide for cyclical closings of the switches, the switches being identified in FIGS. 1–3 by the legends $\phi_{E1}$–$\phi_{En}$. The outputs of the ring counter 6 operate as 1-out-of-n decoder so that the switch group 2 is cyclically switched through with these output signals. The output terminals of a ring counter 7 connect with control terminals of respective ones of the switches of the output switch group 4, as shown in FIGS. 1 and 2, to provide for cyclical closings of the switches which are identified in FIGS. 1–3 by the legends $\phi_{O1}$–$\phi_{On}$. After each cycle of the ring counter 6, the second ring counter 7 is acted on by the transfer pulse from the ring counter 6, the second ring counter 7 responding in the same way as the ring counter 6 at its outputs and thereby controlling the switch group 4, as a result of which the outputs of the sensor structure 3 are cyclically connected to the comparator 5.

From the clock generator 12 there is clocked a shift register 9 which is controlled by an R-S flip-flop 8 at its data input. In this way, data which are determined by the comparator 5 are shifted in clock synchronism into the shift register 9.

In this way, commencing with a control-word cycle, logical ones and zeros are shifted into the shift register 9 until a switch combination is reached with which the signal of the source 1 switches the comparator 5, and from this time on, logical zeros and ones respectively pass into the shift register 9. This process is repeated upon each control-word cycle, as a result of which there is produced at the output of the shift register 9 a pulse-width-modulated signal PWM, the pulse duty factor of which is determined directly by the position of the sensor probe.

The reset circuit 11 assures well-defined conditions after the application of the operating voltage. An output signal of the reset circuit 11 activates the clock generator 12, and also activates an AND gate 10 to couple signals from the ring counter 7 to the reset terminal of the flip-flop 8.

Due to crosstalk effects of the sensor switches there may be produced a course of the signal with respect to the sensor position which shown in idealized form in FIG. 4b. The probe of the sensor has the position i. The largest signal S can be detected on the comparator 5. However, when crosstalk is present at adjacent positions ($X_{i-2}$, $X_{i-1}$, $X_{i+1}$, etc.) a signal is also produced which differs from the signal with respect to $X_i$ in its amplitude by dS.

In order better to distinguish the signal S in the position $X_1$ from signals of adjacent positions, the circuit shown in FIG. 4a is proposed.

The integrator 13 suppresses noise signals and forms a band filter with the differentiator 14. With suitable selection of the generator signal, only the signals of interest for the selected frequency band are evaluated with this circuit.

The differentiator 14 furthermore makes possible a precise detection in time of the signal (FIG. 4c) by differentiation, as shown in FIG. 4d. The comparator 5 can thus switch precisely at the time of the electronic scanning of the mechanical position $X_i$ of the probe.

The dynamics of the electronic and mechanical components are so adapted to the dynamics of the generator signal that no substantial influences due to circuit inaccuracies of the electronic system on the precision of the pulse-width-modulated signal PWM can be noted at the output of the circuit.

FIG. 5 shows a capacitive sensor structure which corresponds to the arrangement in accordance with the invention. In addition to the capacitative development, however, sensors which operate on the basis of other principles of action are also considered.

In FIG. 5a the periodic structures which are scanned are shown. Each structure consists of eight electrodes 18 of small surface lying alongside of each other, in each case two electrodes being connected to the same signal line. Each combination of four small-surface electrodes 18 has a large-surface electrode 15 associated with it. The structures are arranged approximately symmetrically. The spatially separated arrangement of the stationary electrodes 18 serves in this connection for greater attenuation of the crosstalk effect.

The arrangement of the electrodes 18 and 15 makes it possible to reduce the signal lines. With the eight electrodes present, only four lines are required. The unequivocal association upon the processing of the signal is effected via the electrode 15.

As shown in FIG. 5c, the stationary electrodes 15 and 18, which are arranged on a substrate support 19, are passed over by a linearly movable probe 20. It is formed of electrodes 17 facing the stationary electrodes 18 and of outer electrodes 16 which are opposite the large-surface electrodes 15.

The stationary electrodes 15, 18 and probe electrodes 16 and 17 which are in each case located above each other exert a switch function. Various switch combinations are possible, all of which can be selected unambiguously via the electrodes 15.

The arrangement describes operates as linear transmitter but can also be developed just as well as angle transmitter.

I claim:

1. A signal processing system for a plurality of absolute-value sensors constituting a periodic sensor structure, the system including at least one probe; wherein within the periodic sensor structure, there is a measurement surface which is divided into several measurement sections, the measurement surface lies opposite said at least one probe, and each of said measurement sections represents a position marking;

said periodic sensor structure has inputs and outputs, and said system includes a first switch group and a second switch group, a switch driving means connected to each of said switch groups, a signal source, and an evaluation circuit;

the inputs of the periodic sensor structure are cyclically connected via said first switch group to said signal source, and the outputs of the periodic sensor structure are cyclically connected via said second switch group to said evaluation circuit, said switch driving means operating individual switches of said first switch group to provide cyclical connection between individual ones of the sensor structure inputs to said signal source, said switch driving means operating individual switches of said second switch group to provide cyclical connection between individual ones of the sensor structure outputs and said evaluation circuit;

said at least one probe, in combination with a plurality of said measurement sections, constitute at least one switch unit for each of said measurement positions; and switch units of the periodic sensor structure which represents a common position are connected to each other on at least one side which is an input side or an output side.

2. A system according to claim 1, wherein said evaluation circuit comprises a clock generator, a comparator, a trigger circuit, and a shift register;

the output of said comparator is connected to a first input of said trigger circuit, said trigger circuit has a second input connecting to said second switch group, an output of said trigger circuit is connected to a data input of said shift register; and a clock input of said shift register connects with said clock generator.

3. A system according to claim 2, wherein said switch driving means comprises a first ring counter for operating switches of said first switch group, and a second ring counter for operating switches of said second switch group;

wherein said clock generator is connected to said first ring counter which, in its turn, drives said second ring counter, said trigger circuit comprising a flip flop; and an output of said second ring counter connects with the reset input of said flip flop, the set input of said flip flop is connected to the output of said comparator, said shift register being clocked by said clock generator.

4. A system according to claim 3, further comprising a reset circuit electrically connected between the clock generator and the second ring counter.

5. A system according claim 3, further comprising a band filter connected between the second switch group and said comparator.

6. A system according to claim 5, wherein said filter comprises an integrator and a following differentiator, the integrator connecting with an output of said second switch group and the differentiator connecting with the comparator.

7. A system according to claim 5, wherein said band filter comprises a series connection of an integrator and a differentiator.

8. A signal processing system for a plurality of absolute-value sensors constituting a periodic sensor structure, the system including at least one probe; wherein within the periodic sensor structure, there is a measurement surface which is divided into several measurement sections, the measurement surface lies opposite said at least one probe, and each of said measurement sections represents a position marking;

said periodic sensor structure has inputs and outputs, and said system includes a first switch group and a second switch group, a switch driving means connected to each of said switch groups, a signal source, and an evaluation circuit;

the inputs of the periodic sensor structure are cyclically connected via said first switch group to said signal source, and the outputs of the periodic sensor structure are cyclically connected via said second switch group to said evaluation circuit, said switch driving means operating individual switches of said first switch group to provide cyclical connection between individual ones of the sensor structure inputs to said signal source, said switch driving means operating individual switches of said second switch group to provide cyclical connection between individual ones of the sensor structure outputs and said evaluation circuit;

said at least one probe, in combination with a plurality of said measurement sections, constitute at least one switch unit for each of said measurement positions;

switch units of the periodic sensor structure which represents a common position are connected to each other on at least one side which is an input side or an output side;

said switch driving means comprises a first ring counter for operating switches of said first switch group, and a second ring counter for operating switches of said second switch group; and the system further comprises a clock generator which drives said first ring counter, an output signal of said first ring counter serving to drive said second ring counter.

* * * * *